United States Patent
Chon et al.

(10) Patent No.: US 9,632,576 B2
(45) Date of Patent: Apr. 25, 2017

(54) FLEXIBLE DISPLAY APPARATUS AND CONTROL METHOD THEREOF

(71) Applicant: SAMSUNG ELECTRONICS CO., LTD., Suwon-si, Gyeonggi-do (KR)

(72) Inventors: Sei-hee Chon, Suwon-si (KR); Jae-won Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 371 days.

(21) Appl. No.: 13/900,088

(22) Filed: May 22, 2013

(65) Prior Publication Data
US 2013/0328764 A1 Dec. 12, 2013

(30) Foreign Application Priority Data
Jun. 11, 2012 (KR) .................. 10-2012-0062304

(51) Int. Cl.
G06F 3/01 (2006.01)
G06F 3/0487 (2013.01)
G06F 3/03 (2006.01)
G06F 3/0488 (2013.01)

(52) U.S. Cl.
CPC ............... *G06F 3/01* (2013.01); *G06F 3/017* (2013.01); *G06F 3/03* (2013.01); *G06F 3/0487* (2013.01); *G06F 3/04883* (2013.01)

(58) Field of Classification Search
CPC ... G06F 3/01; G06F 3/017; G06F 3/03; G06F 3/0487
USPC ......................................... 345/156
See application file for complete search history.

(56) References Cited

U.S. PATENT DOCUMENTS

| | | | |
|---|---|---|---|
| 8,502,788 B2 | 8/2013 | Cho | |
| 9,177,501 B2 | 11/2015 | Moriwaki | |
| 2005/0060661 A1* | 3/2005 | Kawahara et al. | 715/782 |
| 2009/0019401 A1* | 1/2009 | Park et al. | 715/841 |
| 2009/0219247 A1* | 9/2009 | Watanabe et al. | 345/157 |
| 2009/0324161 A1* | 12/2009 | Prisco | 385/13 |
| 2010/0056223 A1 | 3/2010 | Choi et al. | |
| 2010/0117975 A1* | 5/2010 | Cho | G06F 1/1626 345/173 |
| 2011/0134144 A1 | 6/2011 | Moriwaki | |
| 2012/0306910 A1* | 12/2012 | Kim | H04N 13/04 345/619 |

(Continued)

FOREIGN PATENT DOCUMENTS

| | | |
|---|---|---|
| CN | 101739171 | 6/2010 |
| CN | 102087824 | 6/2011 |
| JP | 2013-101258 | 5/2013 |

OTHER PUBLICATIONS

Extended European Search Report dated Nov. 2, 2016 in European Patent Application No. 13170579.0.

(Continued)

*Primary Examiner* — Viet Pham
(74) *Attorney, Agent, or Firm* — Staas & Halsey LLP

(57) ABSTRACT

A flexible display apparatus includes a display unit which displays a screen which includes at least one object; a sensor unit which senses a bent state of the display unit; and a control unit which controls the display unit to display a 3D image of the at least one object deployed in the bending direction of the display unit, if it is determined that the display unit is bent in a predetermined cylinder shape based on the bent state sensed by the sensor unit.

14 Claims, 25 Drawing Sheets

(56) References Cited

U.S. PATENT DOCUMENTS

2013/0241921 A1* 9/2013 Kurtenbach et al. ......... 345/419

OTHER PUBLICATIONS

Chinese Office Action dated Oct. 8, 2016 in Chinese Patent Application No. 201310233410.6.

* cited by examiner

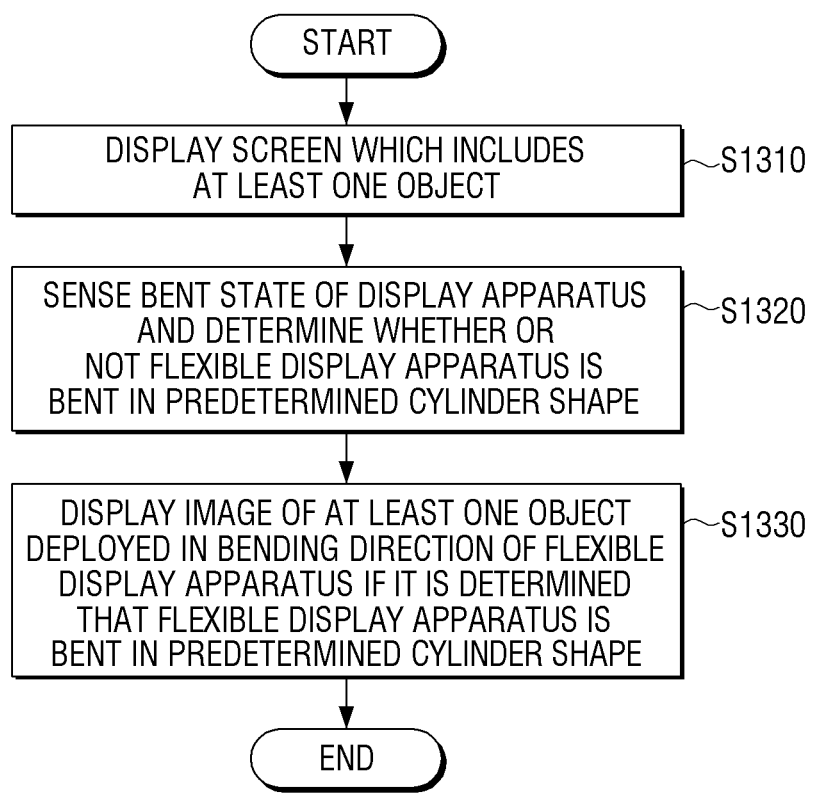

FLEXIBLE DISPLAY APPARATUS AND CONTROL METHOD THEREOF

CROSS-REFERENCE TO RELATED APPLICATIONS

This application claims priority from Korean Patent Application No. 10-2012-0062304, filed in the Korean Intellectual Property Office on Jun. 11, 2012, the disclosure of which is incorporated herein by reference.

BACKGROUND

1. Field

Methods and apparatuses consistent with the exemplary embodiments relate to a flexible display apparatus and control method thereof, and more particularly to a flexible display apparatus which provides a feedback effect according to a change of shape, and a control method thereof.

2. Description of the Related Art

Due to the advancement of electronic technologies, various types of display apparatuses are being developed. Especially, display apparatuses such as a TV, PC, laptop computer, tablet PC, mobile phone, and MP3 player etc. are widely spread and are in use in most households.

Recently however, efforts are being made to develop new types of display apparatuses in order to address needs of users who want even more new and various functions, so called next generation displays.

An example of a next generation display apparatus is a flexible display apparatus, which has a function of changing shape like paper.

In a flexible display apparatus, a user may change shapes by applying force, and thus such a display apparatus may be used for various purposes. For example, it may be embodied as a portable apparatus such as a mobile phone, tablet PC, digital photo frame, PDA, and MP3 player etc.

There is a need for a method to use the characteristic of changing shapes of a flexible display apparatus in providing various types of screens.

SUMMARY

An aspect of the exemplary embodiments relates to a flexible display apparatus which provides a display screen which is capable of maximizing visual effects in a changed shape, and a control method thereof.

Additional aspects and/or advantages will be set forth in part in the description which follows and, in part, will be apparent from the description, or may be learned by practice of the invention.

According to an exemplary embodiment of the present disclosure, a flexible display apparatus may include a display unit which displays a screen which includes at least one object; a sensor unit which senses a bent state of the display unit; and a control unit which controls the display unit to display a three dimensional (3D) image of the at least one object deployed in the bending direction of the display unit, if it is determined that the display unit is bent in a predetermined cylinder shape based on the bent state sensed by the sensor unit.

Herein, the 3D image may be an image of the at least one object which has been 3D scanned, and converted to be deployed and displayed on the cylinder shape screen.

In addition, the 3D image may be a panorama image of the at least one object including at least two images photographed in two different directions and stitched to be deployed and displayed on the display unit bent in the cylinder shape.

Furthermore, the apparatus may further include a storage unit which stores a two dimensional (2D) image or the 3D image of the at least one object, and the control unit may control the display unit to display the 3D image on the screen if the display unit is bent in the predetermined cylinder shape, and to display the 2D image if the display unit is not bent in the predetermined cylinder shape.

Furthermore, the sensor unit may include two sensing modules which are provided at a side and at another side facing the side of the flexible display apparatus, and the control unit determines that the display unit is bent in a cylinder shape if it is determined that the two sensing modules are located within a predetermined distance range.

In addition, the sensor unit may include a bend sensor which senses bending information, and the control unit may determine that the display unit is bent in a cylinder shape if it is sensed by the bend sensor that the display unit is bent by or above a predetermined curvature radius.

According to an exemplary embodiment of the present disclosure, a control method of a flexible display apparatus may include displaying a screen which includes at least one object; sensing a bent state of the flexible display apparatus, and determining whether or not the flexible display apparatus is bent in a predetermined cylinder shape according to a result of the sensing; and displaying a 3D image of the at least one object which has been deployed in a bending direction of the flexible display apparatus, on the screen.

Herein, the 3D image may be an image of the at least one object which has been 3D scanned, and converted to be deployed and displayed on the cylinder shape screen.

In addition, the 3D image may be a panorama image of the at least one object consisting of at least two images photographed in two different directions and stitched to be deployed and displayed on the display unit bent in the cylinder shape.

Furthermore, the displaying the screen may display a 2D image of the at least one object prestored, and the displaying the 3D image on the screen may display a 3D image of the at least one object prestored.

In addition, the determining may determine that the flexible display apparatus is bent in a cylinder shape if it is sensed that two sensing modules which are provided at a side and at another side facing the said of the flexible display apparatus are located within a predetermined distance range.

Furthermore, the determining may determine that the flexible display apparatus is bent in a cylinder shape, if it is sensed by a bend sensor which senses bending information that the flexible display apparatus is bent by or above a predetermined curvature radius.

According to the present disclosure as aforementioned, it is possible to provide a user with intuitive feedbacks according to changes of shape of a flexible display apparatus.

BRIEF DESCRIPTION OF THE DRAWINGS

The above and/or other aspects of the present disclosure will be more apparent by describing certain present disclosure with reference to the accompanying drawings, in which:

FIG. 13 is a flowchart for explaining a method of controlling a flexible display apparatus according to an exemplary embodiment of the present disclosure.

DETAILED DESCRIPTION

Figure 1:
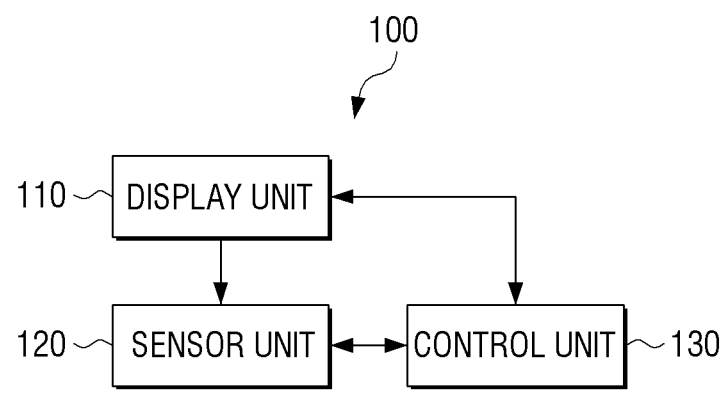
FIG. 1 is a block diagram of a configuration of a flexible display apparatus according to an exemplary embodiment of the present disclosure.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram illustrating a configuration of a flexible display apparatus according to an exemplary embodiment of the present disclosure. According to FIG. 1, the flexible display apparatus 100 includes a display unit 110, sensor unit 120, and control unit 130.

The display unit 110 displays a screen which includes at least one object. The flexible display apparatus 100 which includes the display unit 110 has a characteristic of bending. Thus, the display unit 110 must be produced in a structure and with material that can be bent.

A detailed configuration of the display unit 110 is explained hereinafter.

The sensor unit 120 may sense a bent state formed by a user's manipulation regarding the display unit 110. More specifically, the sensor unit 120 may sense whether or not the display unit 110 is bent in a cylinder shape.

More specifically, the sensor unit 120 may include two sensing modules which are provided at a side and at another side facing the side of the flexible display apparatus 100. Herein, the two sensing modules may be embodied to generate a certain event if they are located within a predetermined distance range. For example, the two sensing modules may be embodied in types of generating electric signals, magnetic signals, and static signals etc. if the two sensing modules are located within a predetermined distance range.

Otherwise, the sensor unit 120 may be embodied as a bend sensor which senses a bent extent of the display unit 110. Herein, the bend sensor may be placed on a predetermined area of the display unit 110 and may generate a signal according to the bent extent of the display unit 110. Detailed explanation thereof will be explained hereinafter.

The control unit 130 may display a screen having a shape according to a bent state of the display unit 110.

More specifically, the control unit 130 may display a three dimensional (3D) image of an object included in the screen which has been deployed in a bending direction of the display unit 110, if it is determined that the display unit 110 is bent in a cylinder shape. For example, the 3D image may be displayed in such a manner that all sides of the object are displayed in 360° at a state where the display unit 100 is bent horizontally.

The 3D image of such an object may be generated in various shapes.

For example, the 3D image of the object may be generated in a cylindrical projection method. Herein, the cylindrical projection method is a method of covering a certain object with a cylinder and then unfolding the cylinder, so that all sides of the 3D object can be drawn on a two dimensional (2D) surface. That is, it is a 3 dimensional method of covering a 3D object with a cylinder and then sending light from a center of the 3D object, and drawing a surface of the 3D object projected on the cylinder.

A 3D image where such a cylindrical 3 dimensional method is applied may be generated through a 3D scanner. The 3D scanner may perform a 3D scanning of an object in various angles using a laser etc., process a plurality of scan images generated and convert them into a cylinder shape, thereby generating a 3D graphic data. Herein, a 3D scanning refers to generating a digital 3 dimensional model representing characteristics of shapes and colors of a 3D object. The 3D scanning may be performed through modeling geometrical shapes of the 3D object, projecting the 3D object on a 2D surface, and rendering of colors and shading of the generated 3D object.

Herein, the modeling is a process of expressing shapes of the 3D object using a 3D coordinates system. A wire frame model, polygon surface model, and solid model etc. may be applied as the modeling process. The wire frame model is a most basic method of expressing only a frame of the object, and the solid model is a highest standard model most widely used commercially. It generates a three dimensional effect with lumps, and thus expresses physical characteristic and volume of the object. Furthermore, the polygon surface model is a method of putting surfaces such as triangles or quadrangles on a basic wire frame, generating only the outside and leaving the inside empty, while a model by 3D scanning is a method of scanning an actual face of a person or an object and modeling it. Through such various modeling methods, it is possible to model geometrical shapes of a 3D object.

Otherwise, it is also possible to generate a panorama image by stitching at least two images photographed from different angles. More specifically, it is possible to photograph an object from at least two directions and obtain a frame so as to obtain an image seen from 360°. Then, a background image may be removed from at least two frames obtained, extracting only the object image and then stitching them, generating a panorama image seen from 360°.

For example, it is possible to obtain two images photographed from a front direction and back direction of the 3D object, process the obtained image in such a manner of deploying curved areas on the surface, and stitching the processed images as one serial image. In this case, a fisheye lens etc. which is a super-wide-angle lens of which an angle of view exceeds 180° may be used in obtaining the photographed image.

Meanwhile, as aforementioned, the display unit 110 must be produced in such a manner as to enable bending. The sensor unit 120 may sense a bent state in various methods.

Hereinbelow is a detailed explanation on a configuration of the display unit 110 and a bending sensing method thereof.

Figure 2:
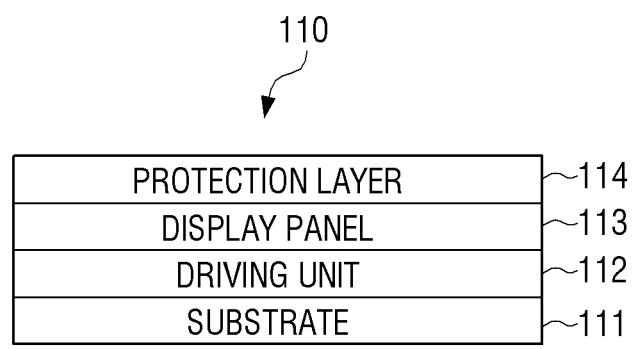
FIG. 2 is a view for explaining a basic structure of a display unit which is provided in a flexible display apparatus according to an exemplary embodiment of the present disclosure.

FIG. 2 is a view for explaining a basic structure of a display unit which forms a flexible display apparatus according to an exemplary embodiment of the present disclosure. According to FIG. 2, the display unit 110 includes a substrate 111, driving unit 112, display panel 113 and protection layer 114.

The flexible display apparatus 100 refers to an apparatus which may be curved, bent, folded or rolled like paper while maintaining display characteristics of a conventional flat panel display. Therefore, a flexible display apparatus must be produced on a flexible substrate.

More specifically, the substrate 111 may be embodied as a plastic substrate (for example, high molecular film) which may be transformed by pressure from outside.

The plastic substrate has a structure where barrier coating has been performed on both sides of a base film. The base material may be various resins such as PI (Polyimide), PC (Polycarbonite), PET (Polyethyleneterephtalate), PES (Polyethersulfone), PEN (Polythylenenaphthalate), and FRP (Fiber Reinforced Plastic) etc. In addition, the barrier coating is performed on surfaces facing each other in the base material, and an organic or inorganic film may be used to maintain flexibility.

Meanwhile, besides the plastic substrate, a substance having a flexible characteristic such as a thin glass or metal foil etc. may be used instead.

The driving unit 112 has a function of driving a display panel 113. More specifically, the driving unit 112 applies driving voltage to a plurality of pixels which form the display panel 113. The driving unit 112 may be embodied as a TFT (thin film transistor), LTPS (low temperature poly silicon) TFT, and OTFT (organic TFT), etc. The driving unit 112 may be embodied as various types according to embodiment shape of the display panel 113. For example, the display panel 113 may include an organic light emitting diode having a plurality of pixel cells and electrode layers which cover both surfaces of the organic light emitting body. In this case, the driving unit 112 may include a plurality of transistors each of which correspond to each pixel cell of the display panel 113. The control unit 130 applies electricity signals to a gate of each transistor, and emits pixel cells connected to each transistor. Accordingly, images may be displayed.

Otherwise, the display panel 113 may be embodied as an electro luminescent (EL), EPD (electrophoretic display), ECD (electrochromic display), LCD (liquid crystal display), AMLCD (active matrix liquid crystal display), and PDP (plasma display panel) besides an organic light emitting diode. However, in case of an LCD, since it cannot emit light by itself, an additional backlight is necessary. In case of an LCD which does not use backlight, surrounding light is used. Therefore, an LCD display panel 113 which does not use backlight may be used outdoors where there is much light.

The protection layer 114 has a function of protecting the display panel 113. For example, materials such as ZrO, CeO2, ThO2 etc. may be used in the protection layer 114. The protection layer 114 may be produced in a transparent film type and cover an entirety of the display panel surface 113.

Meanwhile, as illustrated in FIGS. 3A-3D, the display unit 110 may be embodied as electronic paper. The electronic paper is a display where characteristics of general ink are applied, and a different thing about the electronic paper compared to general panel displays is that it uses reflected light. Meanwhile, the electronic paper may change pictures or letters using twist balls or dielectrolysis using capsules.

The shape of the flexible display apparatus 100 may change as it is bent by pressure from outside. Bending may include all cases including general bending, folding, and rolling. Herein, a normal bending refers to a state where the flexible display apparatus is bent, folding refers to a state where the flexible display apparatus is folded, and rolling refers to a state where the flexible display apparatus is rolled.

According to an exemplary embodiment of the present disclosure, the flexible display apparatus 100 is rolled in cylinder shape, and thus the main focus of explanation hereinbelow shall be when the flexible display apparatus is rolled.

Rolling refers to a state where the flexible display apparatus is rolled. Rolling may be determined based on a bent angle. For example, a state where a bending by or above a certain bending angle is sensed throughout a certain area may be defined as a rolling, and a state where a bending below a certain bending angle is sensed in a relatively small area compared to a rolling may be defined as a folding. Furthermore, regardless of a curvature radius, a state where a rolled surface of the flexible display apparatus 100 is substantially close to a circle or oval may be defined as a rolling.

FIGS. 3A-3D are views for explaining an arrangement of a bend sensor according to an exemplary embodiment of the present disclosure.

Figure 3A:
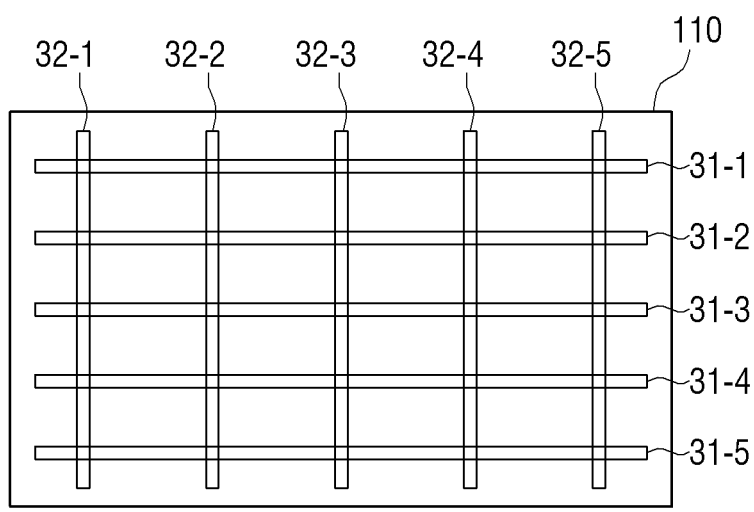
FIGS. 3A-3C are views for explaining an arrangement of a bend sensor according to an exemplary embodiment of the present disclosure.

FIG. 3A illustrates a state where a bend sensor is provided inside a front surface of the display unit 110, but this is just an embodiment, and thus a bend sensor may be provided inside a back surface of the display unit 110 or in both surfaces of the display unit 110. Furthermore, a shape, number and arrangement location of the bend sensor may be changed in various types. For example, one bend sensor or a plurality of bend sensors may be combined with the display unit 110. Herein, the bend sensor may be one which senses one bending data or one which has a plurality of sensing channels which sense a plurality of bending data.

FIG. 3A illustrates an example where a plurality of bend sensors in bar shapes are arranged in a horizontal or vertical direction to form a lattice shape.

According to FIG. 3A, the bend sensor includes bend sensors 31-1 to 31-5 arranged in a first direction and bend sensors 32-1 to 32-5 arranged in a second direction. Each bend sensor may be arranged a certain distance from one another.

FIG. 3A illustrates a state where 5 bend sensors 31-1 to 31-5 and 32-1 to 32-5 are arranged in a horizontal direction and vertical direction, respectively, but this is just an example, and thus a number of bend sensors may be changed. As such, the reason why the bend sensors are arranged in a horizontal and vertical direction is to sense bending occurring in an entirety of the flexible display apparatus, and thus in a case where only a portion of the flexible display apparatus has a flexible characteristic or where bending needs to be sensed in a portion, the bend sensors may be arranged only in the corresponding portion.

Each of the bend sensors 31-5 to 31-5, 32-1 to 32-5 may be embodied as an electric resistance sensor which uses electric resistance or as a micro optical fiber sensor which uses a strain modulus of an optical fiber. Hereinafter is an explanation on a case where a bend sensor is embodied as an electric resistance sensor for convenience of explanation.

Figure 3B:
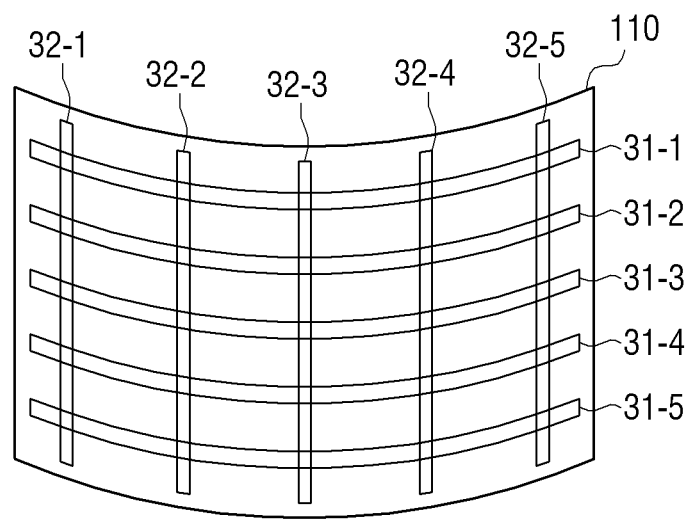
Figure 3C:
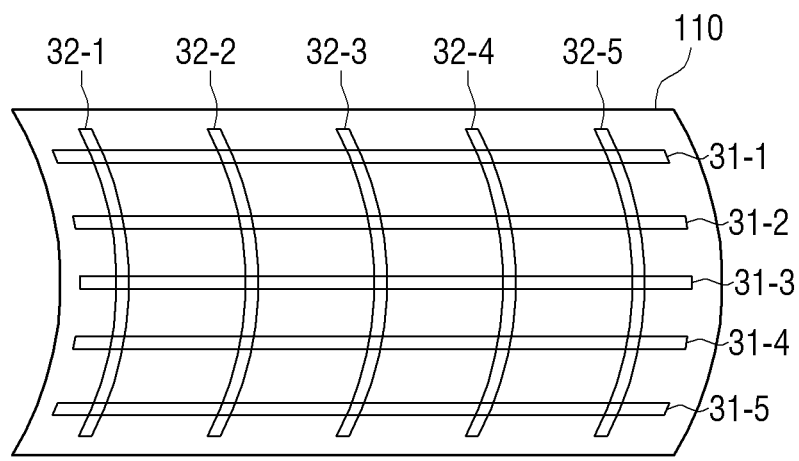

More specifically, in a case where the flexible display apparatus 100 is bent so that a central area located in a center from a left and right corner of the flexible display apparatus 100 faces downwards as in FIG. 3B, a tension by bending is applied to bend sensors 31-1 to 31-5 arranged in a horizontal direction. Accordingly, a resistance value of each of the bend sensors 31-5 to 31-5 arranged in a horizontal direction changes. A sensor unit (not illustrated) may sense a change of an output value output from each bend sensor 31-1 to 31-5 and sense that a bending has occurred in a horizontal direction from a center of the display surface.

Furthermore, in a case where the flexible display apparatus 100 is bent so that the central area located in the center from an upper and lower corner faces an upper direction, a tension is applied to bend sensors 32-1 to 32-5 arranged in a vertical direction. The sensor unit (not illustrated) may sense a change of shape in a vertical direction based on an output value of each of the bend sensors 32-1 to 32-5 arranged in a vertical direction.

Meanwhile, in a case where the change of shape is made in a diagonal direction, a tension is applied to all bend sensors arranged in a horizontal and vertical direction, and thus the sensor unit may also sense a change of shape made in the diagonal direction based on an output value of each of the bend sensors arranged in the horizontal and vertical direction.

FIGS. 4A-4D are views for explaining an arrangement of a bend sensor according to another exemplary embodiment of the present disclosure.

Figure 4A:
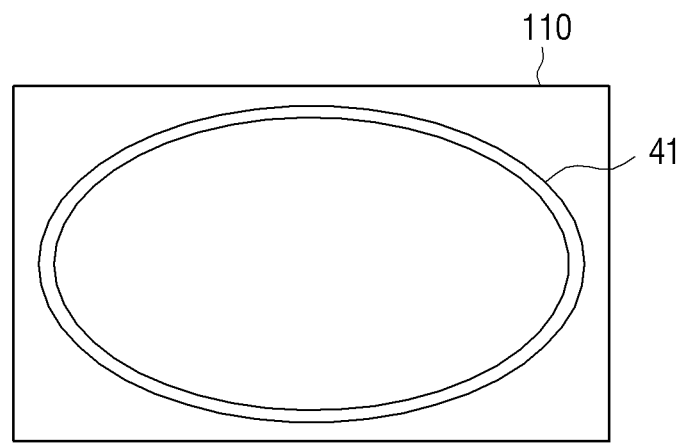
FIGS. 4A-4D are views for explaining an arrangement of a bend sensor according to another exemplary embodiment of the present disclosure.

FIG. 4A illustrates an example of a configuration where one bend sensor is placed on one surface of the display unit 110 and a bending is sensed. According to FIG. 4A, the bend sensor may be embodied in a looped curve shape which forms a circle, quadrangle or another polygon, and placed in a corner of the display unit 110. The flexible display apparatus may determine that a point where a change of output value is sensed on the looped curve line as a bending area.

Figure 4B:
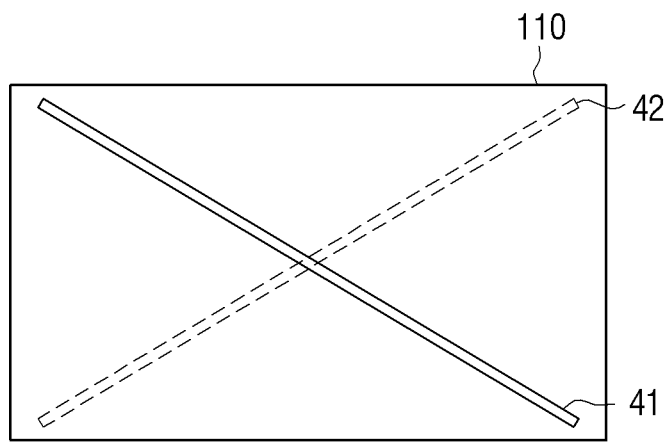

FIG. 4B illustrates an exemplary embodiment where two bend sensors are placed to cross each other. According to FIG. 4B, a first bend sensor 41 is placed on a first surface of the display unit 110, and a second bend sensor 42 is placed on a second surface of the display unit 110. The first bend sensor 41 is placed in a first diagonal direction on the first surface, and the second bend sensor 42 is placed in a second diagonal direction on the second surface. Accordingly, an output value and output point of the first and second bend sensors 41, 42 change according to various bending conditions such as when each corner area is bent, each corner area is bent, a central portion is bent, and a folding or rolling is made, and thus the flexible display apparatus may determine which type of bending has been made according to such output value characteristics.

Meanwhile, in various exemplary embodiments, line type bend sensors have been illustrated, but it is also possible to sense bending using a plurality of fragmentary strain gauges.

Figure 4C:
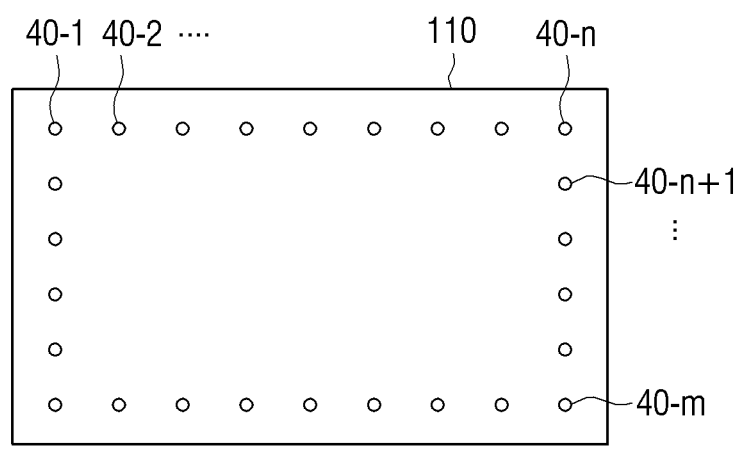
Figure 4D:
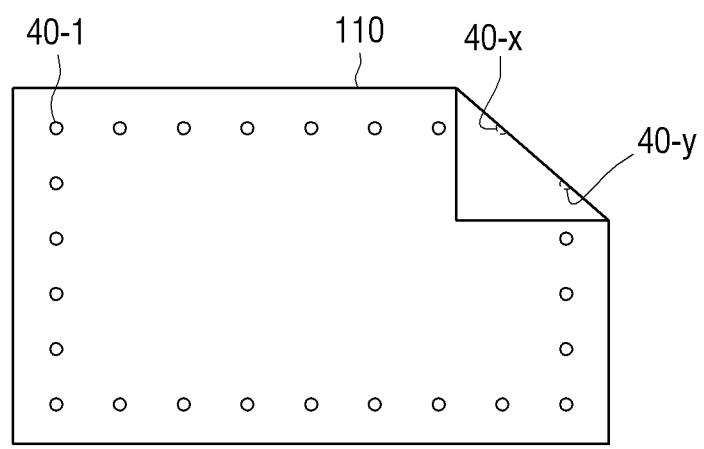

FIGS. 4C and 4D are views illustrating exemplary embodiments where bending is sensed using a plurality of strain gauges. A strain gauge uses a metal or semiconductor of which a resistance significantly changes according to a size of applied force, to sense a change of surface of an object according to a change of resistance value thereof. Generally, in materials such as metal, the resistance value increases when the length increases according to force from outside, but the resistance value decreases when the length decreases. Therefore, by sensing changes of the resistance value, it is possible to determine whether or not a bending has occurred.

According to FIG. 4C, a plurality of strain gauges are placed in a corner area of the display unit 110. A number of the strain gauges may differ according to a size, and shape of the display unit 110, or a predetermined bending sense resolution.

In a state where the strain gauges are placed as in FIG. 4C, a user may bend an arbitrary point in an arbitrary direction. More specifically, in a case where a corner area is bent as in FIG. 4C, from among the strain gauges 40-1~40-n placed in a horizontal direction, force is applied to strain gauges 40-x which overlap with a bending line. Accordingly, the output value of the corresponding gauge 40-x becomes bigger than the output value of the strain gauges. In addition, from among the strain gauges 40-n, 40-n+1, ~~40-m placed in a vertical direction, force is applied to the strain gauges 40-y which overlap with the bending line, changing the output value. The flexible display apparatus may determine that the line which connects two strain gauges 40-x, 40-y of which the output value changed as the bending line.

Hereinbelow is a specific method of sensing a bent state of the flexible display apparatus 100 using a bend sensor.

Figure 5:
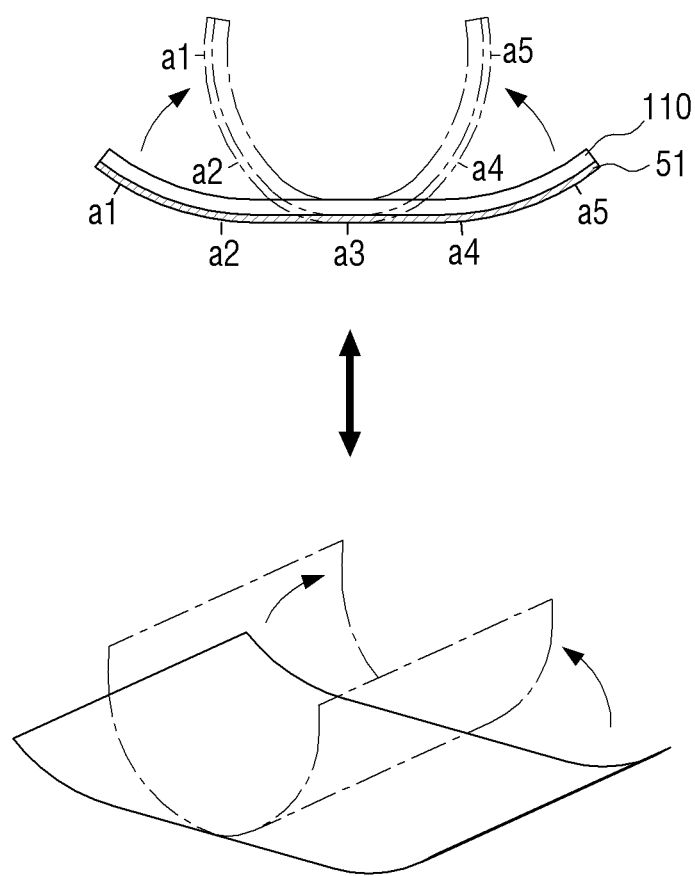
FIG. 5 is a view for explaining a method of determining a bent extent according to an exemplary embodiment of the present disclosure.

FIG. 5 is a view for explaining a method of determining a bent state according to an exemplary embodiment of the present disclosure.

As illustrated in FIG. 5, it is possible to determine a bent state through changes of a bending radius R. A size of a bending radius R may be determined through a difference of a resistance value of each bending sensor as illustrated in FIG. 3, and thus detailed explanation is omitted.

As illustrated, it is possible to determine whether or not the display unit 100 is rolled in a cylinder shape according to an area where bending is sensed and a size of a bending radius R in the area where bending is sensed.

Figure 6A:
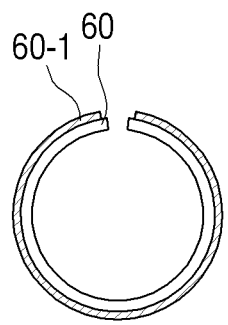
FIGS. 6A and 6B are views for explaining a method of sensing rolling of a flexible display apparatus according to an exemplary embodiment of the present disclosure.
Figure 6B:
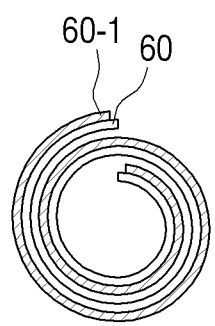

FIGS. 6A and 6B are views for explaining a method of sensing a rolling of the flexible display apparatus.

First of all, FIG. 6A illustrates a cross-sectional view of when the flexible display apparatus 100 is rolled.

As illustrated, when the flexible display apparatus 100 is rolled, a tension is applied to the bend sensor placed in one surface or both surfaces of the flexible display apparatus.

In this case, a strength of the tension applied to the bend sensor may be regarded to be close to each other within a certain range, and thus the resistance value output from the bend sensor also becomes close to each other within a certain range.

In order for a rolling to be made as illustrated in FIG. 6A, the bending must be made by or above a certain curvature. In addition, when the rolling is made, a bending area becomes greater than a general bending or folding. Accordingly, the flexible display apparatus may determine a rolling state when it is sensed that a bending of or above a certain bending angle is made in series.

In addition, according to circumstances, a front surface or back surface of the flexible display apparatus touches each other at a rolling state. For example, when a corner of one side of the flexible display apparatus 60 is bent in a Z+ direction and rolled towards the inside of the display surface, the surface of the display apparatus that is the front surface and the back surface where the bend sensor 60-1 is placed touches each other. In this case, an aforementioned 3D image may be displayed to correspond to the display screen exposed outside.

Figure 7:
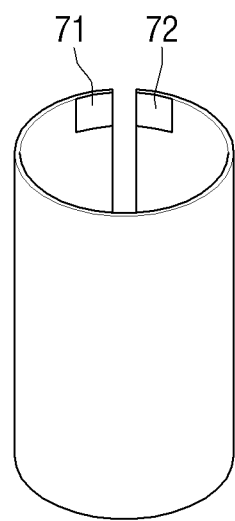
FIG. 7 is a view for explaining a method of sensing rolling of a flexible display apparatus according to according to another exemplary embodiment of the present disclosure.

FIG. 7 is a view for explaining a rolling sense method according to another exemplary embodiment of the present disclosure.

As illustrated in FIG. 7, the flexible display apparatus 70 may include two sensing modules 71, 72 for determining whether or not the flexible display apparatus 70 is bent in a cylinder shape on one side and on a side facing the one side. Herein, the two sensing modules 71, 72 may be embodied as a sensor which generates an electric signal, magnetic signal, and static signal etc. when the two sensing modules exist within a predetermined distance range.

When the flexible display apparatus 100 is rolled in a cylinder shape, a predetermined event may occur in the two sensing modules 71, 72 provided in the flexible display apparatus 100. For example, when the flexible display apparatus 100 is rolled in a cylinder shape and the two sensing modules 71, 72 touch each other, an electric signal may be generated.

As such, the flexible display apparatus 100 may sense a cylinder shape bending, that is a rolling using various types of sensors. The aforementioned configuration and sensing method may be applied separately to the flexible display apparatus 100, or may be combined together and then applied to the flexible display apparatus 100.

Meanwhile, the sensor unit 120 may sense a user's manipulation of a screen of the display unit 110 besides bending.

More specifically, the sensor unit 120 may sense a touch using a touch type capacitance method, pressure type resistance film method, infra-red sensing method, surface ultrasound conduction method, integral calculus tension measurement method, and piezo effect method etc.

For example, the sensor unit 120 may include a transparent conduction film such as an ITO (indium-tin oxide) deposited on a substrate 111 inside the display unit 110 and a film formed on an upper side thereof. Accordingly, when the user touches the screen, an upper and lower panel of the touched point touches each other and an electric signal is sent to the control unit 130. The control unit 130 recognizes the touched point using coordinates of the electrode to which the electric signal has been sent. The touch sensing method has been disclosed in various preceding documents, and thus further explanation is omitted.

Hereinbelow is a specific explanation of a method of displaying a 3D image according to various exemplary embodiments of the present disclosure.

Figure 8:
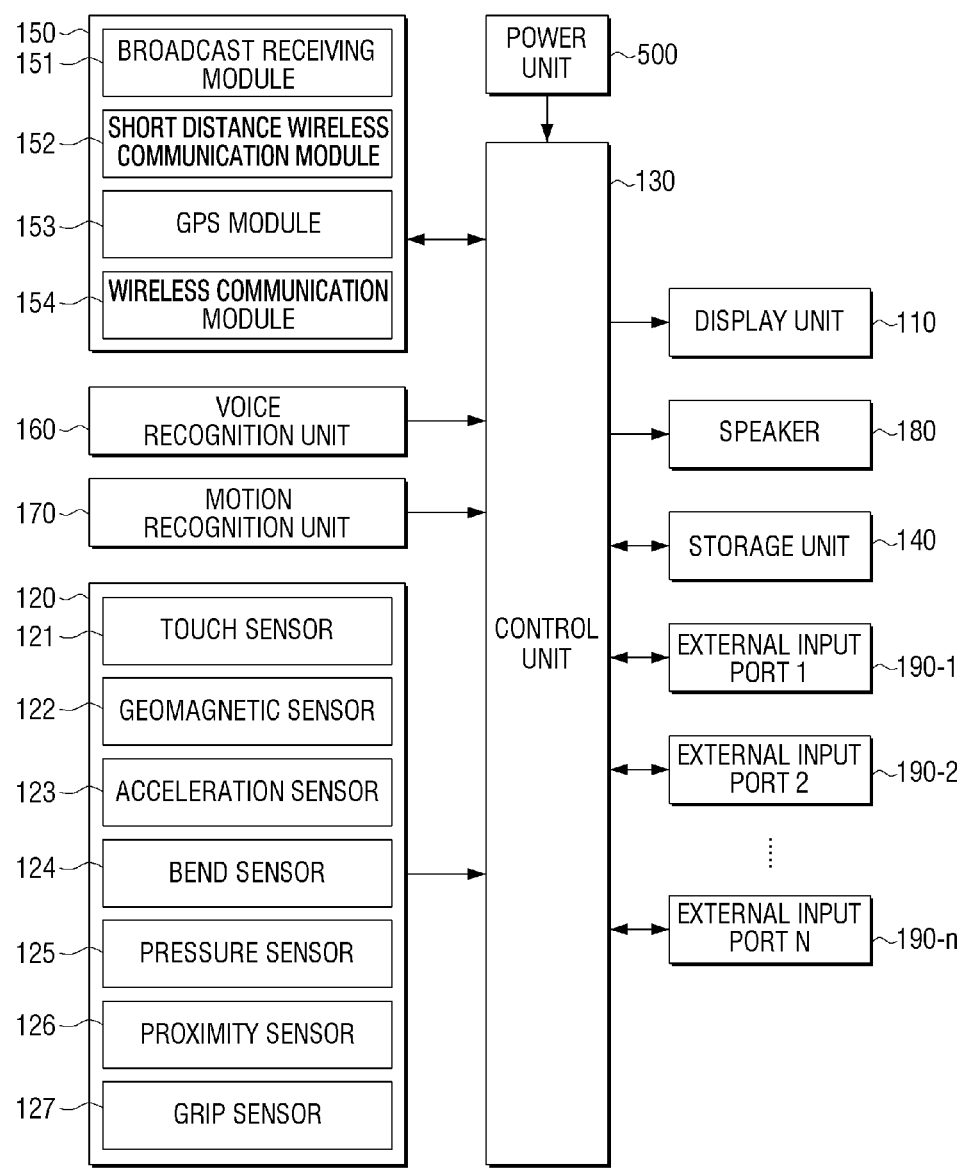
FIG. 8 is a block diagram for explaining an example of a detailed configuration of a flexible display apparatus according to an exemplary embodiment of the present disclosure.

FIG. 8 is a block diagram explaining an example of a detailed configuration of a flexible display apparatus for explaining an exemplary embodiment of the present disclosure.

According to FIG. 8, the flexible display apparatus 100 includes a display unit 110, sensor unit 120, control unit 130, storage unit 140, communication unit 150, voice recognition unit 160, motion recognition unit 170, speaker 180, external input port 190-1~190-n, and power unit 500.

The display unit 110 has a flexible characteristic. Configuration and operations of the display unit 110 were explained in detail hereinabove and thus repeated explanation will be omitted.

In the storage unit 140, various programs related to operating the flexible display apparatus 100, setting information set by the user, a system operating software, and various application programs etc. may be stored.

Especially, in the storage unit 140, a 2D image and 3D image of a certain object may be stored. Herein, the 3D image may be an image deployed and displayed in a horizontal direction when the flexible display apparatus 100 is bent in a cylindrical shape. Detailed explanation thereof was mentioned above, and thus further explanation will be omitted.

The sensor unit 120 senses a user's manipulation occurred in the flexible display apparatus 100 including the display unit 110, especially, a bending move manipulation. According to FIG. 8, the sensor unit 120 may include various types of sensors such as touch sensor 121, geomagnetic sensor 122, acceleration sensor 123, bend sensor 124, pressure sensor 125, proximity sensor 126, and grip sensor 127.

The touch sensor 121 may be embodied as a capacitive type touch sensor or decompression type touch sensor. The capacitive type touch sensor refers to a type of sensor which uses dielectric coated on a surface of the display unit 110 to sense minute electricity sent to the user's body when a body part of the user touches a surface of the display unit 110. The decompression touch type sensor refers to a type of touch sensor which includes two electrodes provided inside a remote control, and when a user touches it, senses a current flowing due to a touch by an upper panel and lower panel at the touched point, and then calculating the touched coordinates. Besides the above, an infrared light sensing method, surface ultrasound wave conduction method, integral type tension measurement method, and piezo effect method etc. may be used in sensing touch manipulations.

The geomagnetic sensor 122 is a sensor for sensing a rotation state and moving direction etc. of the flexible display apparatus 100, and the acceleration sensor 123 is a sensor for sensing an inclination extent of the flexible display apparatus 100. As aforementioned, the geomagnetic sensor 122 and acceleration sensor 123 may be used to detect bending characteristics such as a bending direction or bending area, but besides that, they may be used to detect a rotation state or inclination state etc. of the flexible display apparatus 100.

The bending sensor 124 may be embodied in various shapes or numbers as aforementioned, and sense the bent state of the flexible display apparatus 100. Various examples of the configuration and operation of the bend sensor 124 were aforementioned, and thus repeated explanation will be omitted.

The pressure sensor 125 senses a size of a pressure applied to the flexible display apparatus 100 when a user conducts a touch or bending operation, and provides the sensed size to the control unit 130. The pressure sensor 125 may be provided in the display unit 110 and may include a piezo film which outputs an electric signal corresponding to the size of the pressure.

FIG. 8 illustrates the pressure sensor 125 and touch sensor 121 to be provided separately, but in a case where the touch sensor 121 is embodied as a decompression touch sensor, the decompression touch sensor may play the role of the pressure sensor 125 as well.

The proximity sensor 126 is a sensor for sensing a motion of approaching the surface of the display without directly contacting it. The proximity sensor 126 may be embodied as various types of sensors such as a high frequency oscillation type, magnetic type which uses a magnet, and capacitance type which forms a high frequency magnetic field and senses capacitance which changes due to an approach of an object.

The grip sensor 127 is a sensor placed in an edge of the flexible display apparatus 100 or a handle portion separately from the pressure sensor 125, and senses a grip of a user. The grip sensor 127 may be embodied as a pressure sensor or touch sensor.

The control unit 130 may analyze various sensing signals sensed in the sensor unit 120 and display the 3D image stored in the storage unit 140 on the screen when it is determined that the flexible display apparatus 100 is bent in a cylinder shape.

Herein, the 3D image may be a 3D image which corresponds to the 2D image which has been displayed in a state where the flexible display apparatus 100 had not been bent.

The communication unit 150 is an element which performs communication with various types of external devices according to various types of communication methods. The communication unit 150 may include various communication modules such as a broadcast receiving module 151, short distance wireless communication module 152, global positioning system (GPS) module 153, and wireless communication module 154 etc. Besides the above, the communication module 152 may further include mobile communication modules which contact a mobile communication network and perform communication according to various mobile communication standards such as 3G (3rd Generation), 3GPP (3rd Generation Partnership Project), and LTE (Long Term Evolution).

Meanwhile, the control unit 130 may recognize a voice input or motion input besides a bending manipulation or touch manipulation, and perform an operation corresponding to that input. In this case, the control unit 130 may activate the voice recognition unit 160 or motion recognition unit 170.

The voice recognition unit 160 uses a voice acquisition means such as a microphone (not illustrated) to collect the user's voice or external sound, and sends it to the control unit 130. The control unit 130 may perform a task which corresponds to the user's voice, if the user's voice is equivalent to a predetermined voice command, in a case where the control unit is operated in a voice control mode.

Meanwhile, the motion recognition unit 170 uses an image capturing means (not illustrated) such as a camera to obtain a user's image, and sends the obtained image to the control unit 130. In a case of operating in a motion control mode, the control unit 130 analyzes the user's image, and if it is determined that the user made a motion gesture corresponding to the predetermined motion command, performs an operation corresponding to that motion gesture.

Besides the above, each of the external input ports 1, 2~n(190-1~190-n) may be connected to various types of external devices and receive various data, programs, and control commands etc. More specifically, it may include a USB port, headset port, mouse port, and LAN port etc. The power unit 500 is an element which supplies power to each element of the flexible display apparatus 100. The power unit 500 may be embodied to include a positive electrode collector, electrolyte unit, negative electrode, negative electrode collector, and covered part which covers them. The power unit 500 is embodied as a second battery where charging and discharging are possible. The power unit 500 may be embodied in a flexible type so that it may be bent together with the flexible display apparatus 100. In such a case, the power unit 500 may be made from materials having a flexible characteristic such as current collector, electrode, electrolyte, and sheath etc. Specific shapes and materials of the power unit 500 will be explained hereinbelow.

FIG. 8 illustrates various elements that may be included in the flexible display apparatus 100, but the flexible display apparatus 100 should not necessarily include all the elements, neither should it be limited to those elements. That is, elements may be omitted or further added according to the produce type of the flexible display apparatus 100. Likewise, the elements may also be substituted by other elements too.

The control unit 130 controls each element according to the user's manipulation recognized through the aforementioned sensor unit 120, voice recognition unit 160, and motion recognition unit 170, to perform various operations.

Figure 9:
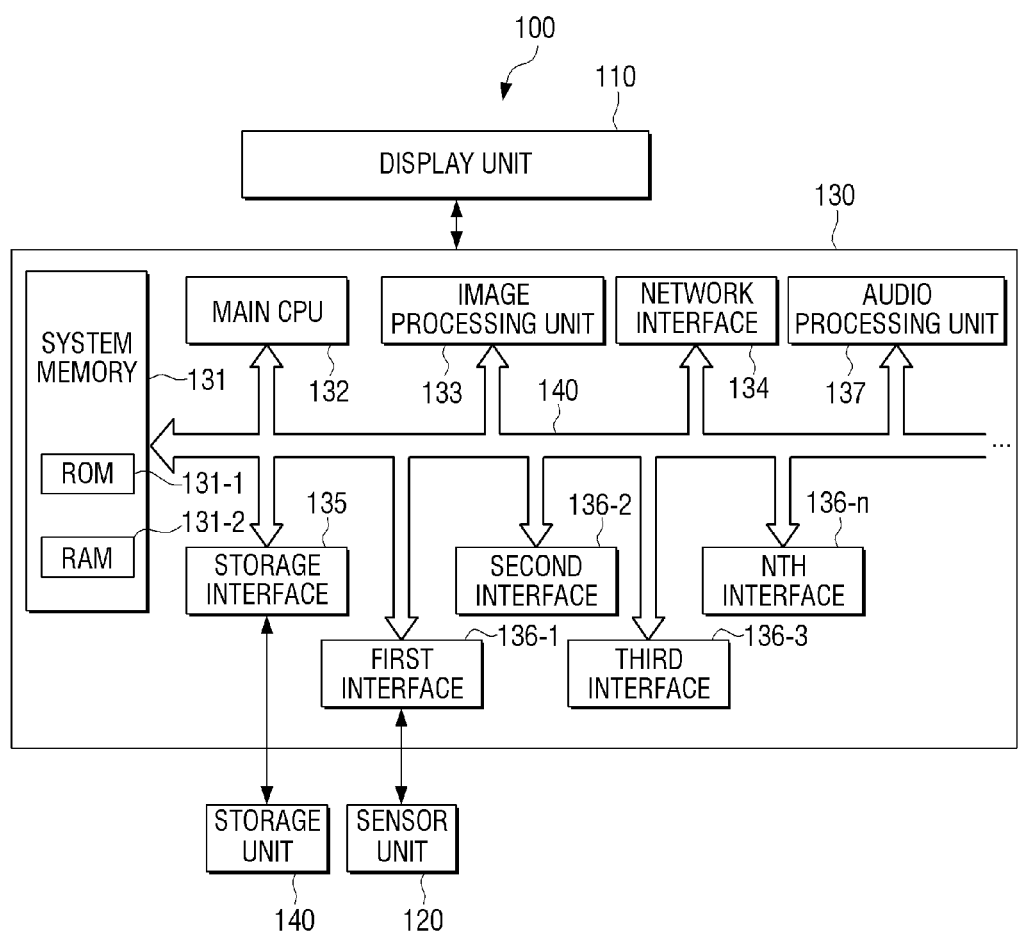
FIG. 9 is a view for explaining a detailed configuration of a control unit 130 illustrated in FIG. 8.

FIG. 9 is a view for explaining a detailed configuration of the control unit 130 illustrated in FIG. 8.

According to FIG. 9, the control unit 130 includes a system memory 131, main CPU 132, image processor 133, network interface 134, storage interface 135, $1^{st}$ to nth interface 136-1~136-n, audio processing unit 137, and system bus 140.

The system memory 131, main CPU 132, image processor 133, network interface 134, storage interface 135, $1^{st}$ to n interfaces 136-1~136-n, audio processing units 137 may be connected to one another through the system bus 140, and transceiver various data or signal etc.

$1^{st}$ to n interfaces 136-1~136-n support interfacing between various elements including the sensor unit 120 and elements in the control unit 130. In addition, at least one of the $1^{st}$ to n interfaces 136-1~136-n may be embodied as a button provided in a body portion of the flexible display apparatus 100, or an input interface which receives various signals from an external apparatus connected through the external input ports 1 to n.

The system memory 131 includes a ROM 131-1 and RAM 131-2. In the ROM 131-1, a command set etc. for system booting are stored. When a turn on command is input and power is supplied, the main CPR 132 copies the O/S stored in the storage unit 140 to the RAM 131-2 according to the command word stored in the ROM 131-1, and executes the O/S to boot the system. When the booting is completed, the main CPU 132 copies various application programs stored in the storage unit 140 to the RAM 131-2, and executes the application program copied in the RAM 131-2 to perform various operations.

As aforementioned, the main CPU 132 may perform various operations according to an execution of the application program stored in the storage unit 140.

The storage unit interface 135 is connected to the storage unit 140 and transceives various programs, contents, and data. The storage unit interface 135 may include a decoder, renderer, and scaler etc. according to an exemplary embodiment of the present disclosure. Accordingly, the storage unit may decode the stored contents, render the decoded contents data to form a frame, and scale the size of the formed frame to fit the screen size of the display unit 110. The image processing unit 133 provides the processed frame to the display unit 110 and displays the processed frame.

Especially, the image processing unit 133 may generate a 3D image to display in a case where the flexible display apparatus 100 is bent in a cylinder shape. For example, the image processing unit 130 may generate a 3D image which provides a 360° view of the corresponding object using at least two images of a certain object photographed in different directions or using a 3D scanned image.

Besides, the audio processing unit 137 refers to an element which processes audio data and sends the processed audio data to a sound output means such as a speaker 180. The audio processing unit 137 may decode the audio data stored in the storage unit 140 or the audio data received through the communication unit 150, filter noise, and then perform audio signal processing such as amplifying with an adequate decibel. In the aforementioned example, in a case where the reproduced contents are video contents, the audio processing unit 137 may process audio data demuxed from the video contents, synchronize the processed audio data with the image processing unit 133, and provide it to the speaker 180.

The network interface 134 is a portion which is connected with external devices through a network. For example, when a web browser program is executed, the main CPU 132 accesses the web server through the network interface 134. When the web page data is received from the web server, the main CPU 132 controls the image processing unit 133 to form a web page screen, and displays the formed web page screen on the display unit 110.

FIGS. 10A-10F are views for explaining a display method of a 3D image according to an exemplary embodiment of the present disclosure.

Figure 10A:
FIGS. 10A-10F are views for explaining a display method of a 3D image according to an exemplary embodiment of the present disclosure.

As illustrated in FIG. 10A, assuming that a front surface of object A includes a text which reads ABCD, while a back surface of object A includes a text which reads EFGH. That is, assuming that object A is a cylinder object where a text which reads ABCDEFGH is included in series from 360°.

Figure 10B:
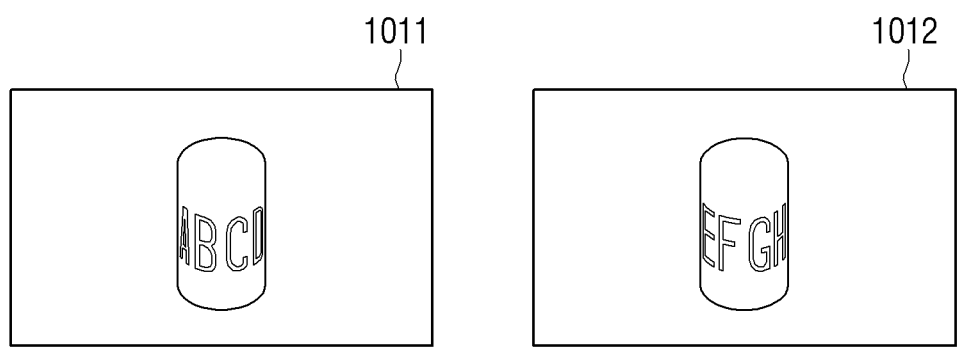

As illustrated in FIG. 10B, object A may be obtained in at least two directions for example an image photographed from a front surface of object A and an image photographed from a back surface of object B. That is, the image illustrated in FIG. 10B may be a 2D photographed image of object A.

Figure 10C:

Herein, as illustrated in FIG. 10C, only the background image is removed from the 2D photographed image illustrated in FIG. 10B and only the image of object A is extracted.

Figure 10D:
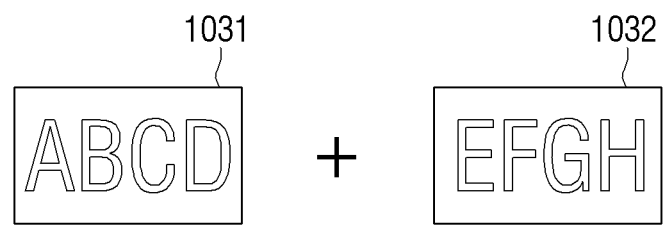

Herein, as illustrated in FIG. 10D, it is possible to image process a curved portion such as a corner area on the extracted object image, and generate an image.

Figure 10E:
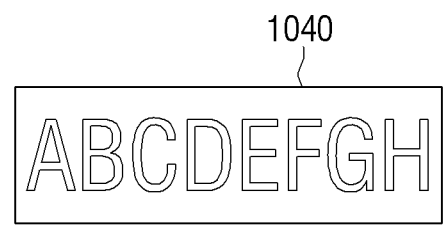

Herein, as illustrated in FIG. 10E, it is possible to stitch images of the front and back surface of object A and generate a 360° panorama image. Herein, the 360° image is in 2D shape for convenience, but this represents an image which may be displayed in 360° when the flexible display apparatus is bent in a cylinder shape.

Figure 10F:
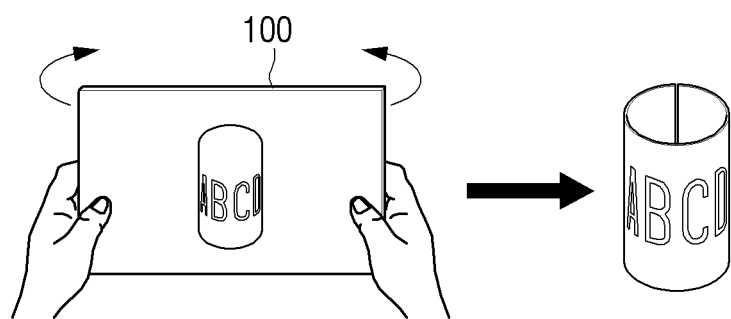

FIG. 10F represents display states when the flexible display apparatus 100 is not bent and when the flexible display apparatus 100 is bent in a cylinder shape.

When the flexible display apparatus 100 is not bent as illustrated in the left view of FIG. 10F, the 3D image of object A may be displayed, and when the flexible display apparatus 100 is bent in a cylinder type as illustrated in the right view, the image of object A may be displayed 3 dimensionally from all 360° direction. That is, it is possible to provide a display shape where the image illustrated in FIG. 10E is bent in a cylinder shape.

Figure 11A:
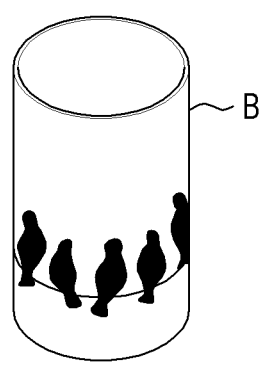
FIGS. 11A-11C are views for explaining a 3D image display method according to another exemplary embodiment of the present disclosure.
Figure 11B:
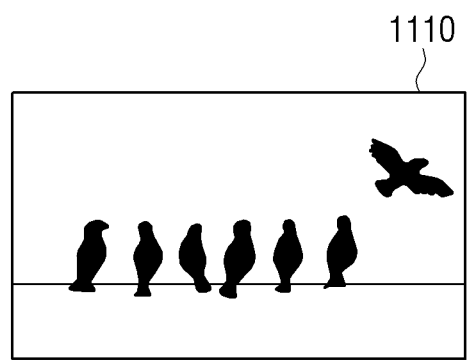
Figure 11C:
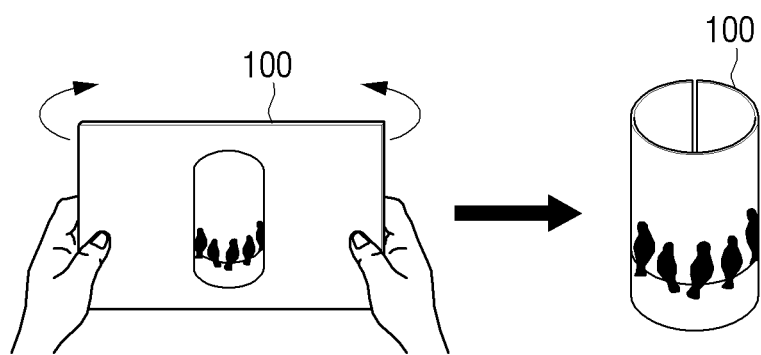

FIGS. 11A-11C are views for explaining a 3D image display method according to another exemplary embodiment of the present disclosure.

For exemplary purposes, assume a cylinder type object B as illustrated in FIG. 11A.

FIG. 11B illustrates an image generated by 3D scanning object B illustrated in a 2 dimensional shape for convenience of explanation. That is, it is possible to generate a 3D image by 3D scanning object B in 360° direction.

FIG. 11C illustrates a state where the flexible display apparatus 100 is not bent and where the flexible display apparatus 100 is bent in a cylinder shape.

When the flexible display apparatus 100 is not bent as illustrated in the left of FIG. 11C, the 2D image of object B is displayed, while when the flexible display apparatus 100 is bent as illustrated in the right of FIG. 11C, object B may be displayed 3 dimensionally in entire 3 dimensional directions.

Meanwhile, exemplary embodiments illustrated in FIGS. 10A-11C are based on an assumption that the object has a cylinder shape, but this is just an exemplary embodiment, and thus even when the object does not have a cylinder shape, a same type of display method may obviously be applied in case of a 3D object as well.

Figure 12A:
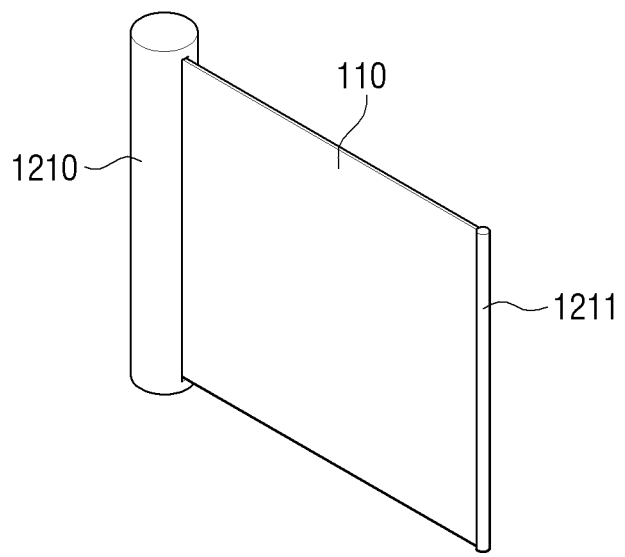
FIGS. 12A and 12B are views for explaining an embodiment shape of a flexible display apparatus according to an exemplary embodiment of the present disclosure.
Figure 12B:
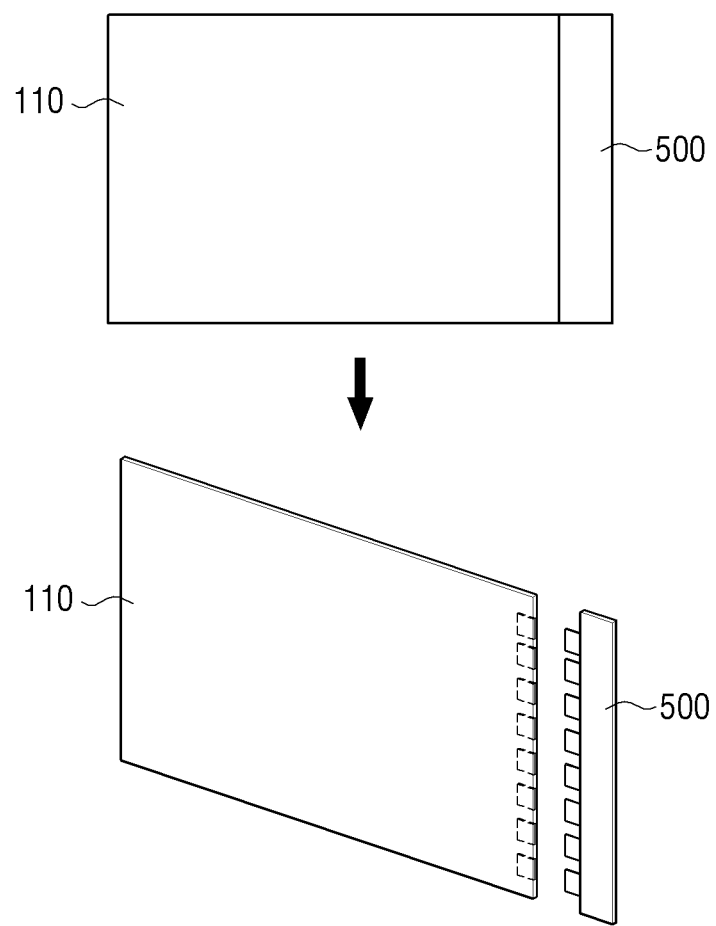

FIGS. 12A and 12B are views for explaining an embodiment shape of a flexible display apparatus according to an exemplary embodiment of the present disclosure.

FIG. 12A is a view illustrating an example of a flexible display apparatus provided in a main body according to an exemplary embodiment of the present disclosure.

According to FIG. 12A, the flexible display apparatus 100 may include a main body 1210, display unit 110, and grip unit 1211.

The main body 1210 plays a role of a case which contains the display unit 110. In a case where the flexible display apparatus 100 includes various elements as in FIG. 8, the rest of the elements besides the display unit 110 and some sensors may be provided in the main body 1210. The main body 1210 includes a rotation roller which rolls the display unit 110. Accordingly, when not in use, the display unit 110 may be rolled around the rotation roller and be provided inside the main body 1210.

When the user grips and pulls a grip unit 1211, the rolling is released as the rotation roller rotates in an opposite direction of the rolling, and the display unit 110 comes outside the main body 1210. A stopper may be provided in the rotation roller. Accordingly, if the user pulls the grip unit 1211 by or above a certain distance, the rotation of the rotation roller is stopped by the stopper, and the display unit 110 may be fixated. Accordingly, the user may use the display unit 110 exposed outside to perform various functions. Meanwhile, when the user presses a button to release the stopper, the rotation roller rotates in a reverse direction as the stopper is released, and as a consequence, the display unit 110 may be rolled inside the main body 1210 again. The stopper may have a switch shape which stops an operation of a gear for rotating the rotation roller. Regarding the rotation roller and stopper, a structure generally used in a rolling structure may be used, and thus specific illustrate and explanation are omitted.

Meanwhile, a power unit 500 is included in the main body 1210. The power unit 500 may be embodied to have various shapes such as a battery connecting unit where a disposable battery is equipped, a second battery which the user may charge by a plurality of times and use, and a solar cell which generates power using solar heat. In a case where the power unit 500 is embodied as the second battery, the user may connect the main body 1210 and external power with a wire and charge the power unit 500.

FIG. 12A illustrates a main body 1210 in a cylinder structure, but the shape of the main body 1210 may also be a quadrangle or another polygon. Furthermore, the display unit 110 may obviously be embodied to have a shape of covering the external portion of the main body or another shape, and not just of being exposed outside by a pulling from the main body 1210.

FIG. 12B is a view illustrating a flexible display apparatus where a power unit 500 may be attached and detached. According to FIG. 12B, the power unit 500 may be provided in one corner of the flexible display apparatus, and be detached.

The power unit 500 may be embodied to be made of a flexible material, and be bent together with the display unit 110. More specifically, the power unit 500 may include a negative electrode collector, negative electrode, electrolyte unit, negative electrode, positive and negative electrode collector, and covered part which covers them.

For example, the current collector may be embodied to be made of alloy type material such as TiNi which has good elasticity, pure gold material such as copper and aluminum etc., pure metal coated with carbon, conductive material such as carbon and carbon fiber etc., and conductive high molecule such as polypyrole etc.

The negative electrode may be produced with negative electrode material such as lithium, natrium, zinc, magnesium, cadmium, hydrogen storage alloy, and lead etc., and negative electrode material such as high molecular electrode material such as organicsulfur fundicide. The electrolyte unit may be produced with sulfur and metallic compound, lithium metallic oxide such as LiCoO2m and positive electrode material such as SOCl2, MnO2, Ag2O, Cl2, NiCl2, and NiOOH. The electrolyte unit may be embodied as a gel type using PEO, PVdF, PMMA, and PVAC.

The covered part may use high molecular resin. For example, PVC, HDPE, or epoxy resin etc. may be used. Beside these, any material which may be curved or folded freely while preventing damage of a thread type battery may also be used as the covered part.

Each of the positive electrode and negative electrode in the power unit 500 may include a connector to be electrically connected to the outside.

According to FIG. 12B, the connector is formed to protrude from the power unit 500, and a furrow corresponding to the location, size and shape of the connector is formed in the display unit 110. Accordingly, by a combination of the connector and furrow, the power unit 500 may be combined with the display unit 110. The connector of the power unit 500 may be connected to the power connecting pad (not illustrated) inside the flexible display apparatus 100 and provide power.

In FIG. 12B, the power unit 500 is illustrated to be detachable from one corner of the flexible display apparatus 100, but this is just an example, and thus the location and shape of the power unit 500 may differ according to the product characteristics. For example, in case of a product where the flexible display apparatus 100 has a certain thickness, the power unit 500 may be provided in a back surface of the flexible display apparatus 100.

FIG. 13 is a flowchart for explaining a method of controlling a flexible display apparatus according to an exemplary embodiment of the present disclosure.

According to the control method of the flexible display apparatus illustrated in FIG. 13, first of all, a screen which includes at least one object is displayed (S1310).

Next, a bent state of the flexible display apparatus is sensed, and it is determined whether or not the flexible display apparatus is bent in a predetermined cylinder shape based on a result of sensing (S1320).

When it is determined in S1320 that the flexible display apparatus is bent in a cylinder shape, a 3D image of at least one object deployed in a bending direction of the flexible display apparatus is displayed on the screen (S1330).

Herein, the 3D image may be a 3D scanned image formed by covering at least one actual object with a cylinder shape display unit and projecting the object to the display unit to form a 3D scanned image.

Otherwise, the 3D image may be an edited image shape image formed by editing at least two images of at least one actual object photographed in two different directions to be displayed on the entire screen bent in a cylinder shape.

Herein, S1310 of displaying the screen may display a prestored 2D image of at least one object, and S1330 of displaying the 3D image on the screen may display the prestored 3D image corresponding to the 2D image.

Furthermore, S1320 may determine that the flexible display apparatus is bent in a cylinder shape, when it is sensed that two sensing modules each of which is provided in one side and another side facing the one side of the flexible display apparatus are within a predetermined distance range.

In addition, S1320 may determine that the flexible display apparatus is bent in a cylinder shape, when it is sensed by the bend sensor which senses bending information that the flexible display apparatus is bent by or above a predetermined curvature radius.

As aforementioned, according to the present disclosure, it becomes possible to increase the visual effects by displaying an object three dimensionally according to the bent state of the flexible display apparatus.

Meanwhile, the aforementioned various methods may be embodied as an application.

More specifically, according to an exemplary embodiment of the present disclosure, there may be provided a non-transitory computer readable medium which stores a program which performs displaying at least one object, and displaying a visual feedback regarding the at least one object, when it is sensed that the bending line moves in series to the first direction on the flexible display apparatus and reaches the location of the at least one object.

Otherwise, a non-transitory readable medium which stores a program for providing feedback effects according to various exemplary embodiments may be provided.

A non-transitory readable medium refers to a medium can be ready by a device and which stores data semi-permanently unlike a medium which stores data for a short time such as a register, cache, and memory etc. More specifically, the aforementioned various applications or programs may be stored in non-transitory readable media such as a CD, DVD, hard disk, blu-ray disk, USD, memory card, and ROM etc. and be provided.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A flexible display apparatus comprising:
a display unit which displays a screen which includes at least one object;
a sensor unit which senses whether the display unit is bent in a predetermined shape; and
a control unit which controls the display unit to display a two dimensional (2D) image of the at least one object when the display unit is not sensed to be bent in the predetermined shape, and a bending state image includ- ing a 360 degree view of the at least one object when the display unit is sensed to be bent in the predetermined shape.

2. The apparatus according to claim 1, wherein the bending state image is an image of the at least one object which has been 3D scanned, and converted to be deployed and displayed on the predetermined shape screen.

3. The apparatus according to claim 1, wherein the bending state image is a panorama image of the at least one object including at least two images photographed in two different directions and stitched to be deployed and displayed on the display unit bent in the predetermined shape.

4. The apparatus according to claim 2, further comprising a storage unit which stores the two dimensional (2D) image and the bending state image of the at least one object.

5. The apparatus according to claim 3, further comprising a storage unit which stores the two dimensional (2D) image and the bending state image of the at least one object.

6. The apparatus according to claim 1, wherein
the sensor unit comprises two sensing modules which are provided at a side and at another side facing the side of the flexible display apparatus, and
the sensor unit senses that the display unit is bent in the predetermined shape if it is determined that the two sensing modules are located within a predetermined distance range.

7. The apparatus according to claim 1, wherein
the sensor unit comprises a bend sensor which senses bending information, and
the sensor unit senses that the display unit is bent in the predetermined shape if it is sensed by the bend sensor that the display unit is bent at or above a predetermined curvature radius.

8. A control method of a flexible display apparatus, the method comprising:
displaying a screen which comprises at least one object;
sensing a bent state of the flexible display apparatus, and determining whether or not the flexible display apparatus is bent in a predetermined shape according to the sensed bent state; and
displaying, on the screen, a two dimensional (2D) image of the at least one object when the flexible display apparatus is not determined to be bent in the predetermined shape, and a bending state image including a 360 degree view of the at least one object when the flexible display apparatus is determined to be bent in the predetermined shape.

9. The method according to claim 8, wherein the bending state image is an image of the at least one object which has been 3D scanned, and converted to be deployed and displayed on the predetermined shape screen.

10. The method according to claim 8, wherein the bending state image is a panorama image of the at least one object consisting of at least two images photographed in two different directions and stitched to be deployed and displayed on the display unit bent in the predetermined shape.

11. The method according to claim 9, wherein the two dimensional (2D) image of the at least one object and the bending state image are stored in the flexible display apparatus.

12. The method according to claim 10, wherein the two dimensional (2D) image of the at least one object and the bending state image are stored in the flexible display apparatus.

13. The method according to claim 8, wherein the flexible display apparatus is determined to be bent in the predetermined shape if it is sensed that two sensing modules which are provided at a side and at another side facing the side of the flexible display apparatus are located within a predetermined distance range.

14. The method according to claim 8, wherein the flexible display apparatus is determined to be bent in the predetermined shape if it is sensed by a bend sensor which senses bending information that the flexible display apparatus is bent at or above a predetermined curvature radius.

* * * * *